US010965607B2

(12) United States Patent
Bastable et al.

(10) Patent No.: US 10,965,607 B2
(45) Date of Patent: Mar. 30, 2021

(54) ARBITRATION OF COMPETING FLOWS

(71) Applicant: Cisco Technology, Inc., San Jose, CA (US)

(72) Inventors: Ian Bastable, Fareham (GB); James Cunningham, Winchester (GB); Gareth John Bowen, Chandlers Ford (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 15/846,291

(22) Filed: Dec. 19, 2017

(65) Prior Publication Data

US 2019/0190843 A1 Jun. 20, 2019

(51) Int. Cl.
*H04L 12/865* (2013.01)
*H04L 12/851* (2013.01)

(52) U.S. Cl.
CPC .......... *H04L 47/6275* (2013.01); *H04L 47/24* (2013.01)

(58) Field of Classification Search
CPC ............................ H04L 47/6275; H04L 47/24
See application file for complete search history.

(56) References Cited

U.S. PATENT DOCUMENTS

| 7,689,738 | B1 * | 3/2010 | Williams | ................ | G06F 13/34 710/52 |
| 2003/0058837 | A1 * | 3/2003 | Denney | ............... | H04L 12/2801 370/352 |
| 2003/0233503 | A1 * | 12/2003 | Yang | ....................... | H04L 47/28 710/100 |
| 2004/0160961 | A1 | 8/2004 | Duckering et al. | | |
| 2012/0173748 | A1 * | 7/2012 | Bouazizi | ............. | H04L 65/4084 709/231 |
| 2013/0077489 | A1 * | 3/2013 | Bloch | ..................... | H04L 47/39 370/235 |
| 2013/0227625 | A1 * | 8/2013 | Forsman | ................. | H04L 65/60 725/109 |
| 2014/0281000 | A1 | 9/2014 | Dattagupta et al. | | |
| 2015/0195589 | A1 | 7/2015 | Jones et al. | | |

(Continued)

OTHER PUBLICATIONS

Casey, Edward et al.: A Priority-Based Adaptive Scheme for Wireless Multimedia Delivery (Jul. 2006).

(Continued)

*Primary Examiner* — Alex Skripnikov
*Assistant Examiner* — Sharmin Chowdhury
(74) *Attorney, Agent, or Firm* — Merchant & Gould P.C.

(57) ABSTRACT

In one embodiment, a gateway includes a memory, and a processor to, in response to receiving a plurality of content requests, generate a plurality of network flows and flow buffers, each one content request of the plurality of content requests being served by one network flow of the plurality of network flows, and one flow buffer of the plurality of flow buffers, the one flow buffer being included in the memory, the plurality of network flows including a first flow and a second flow, the first flow serving one of the plurality of requests having a first priority level, the second flow serving one of the plurality of requests having a second priority level, the first priority level being higher than the second priority level, and run a network arbiter to give prioritize reading the first flow over reading the second flow when the first flow is non-idle.

20 Claims, 5 Drawing Sheets

(56) References Cited

U.S. PATENT DOCUMENTS

| | | | |
|---|---|---|---|
| 2015/0288617 A1* | 10/2015 | Dasher | H04L 47/801 |
| | | | 709/226 |
| 2016/0119404 A1 | 4/2016 | Bowen et al. | |
| 2016/0364484 A1* | 12/2016 | Dong | H04L 67/1097 |
| 2017/0070551 A1 | 3/2017 | Phillips et al. | |
| 2018/0048691 A1* | 2/2018 | Pruden | H04L 65/601 |
| 2019/0098067 A1* | 3/2019 | Sandoval | H04L 65/80 |

OTHER PUBLICATIONS

IBM Knowledge Center; Setsockopt—Set Options Associated with a Socket; Transaction Processing Facility Enterprise Edition 1.1.0.12: [Viewed Sep. 28, 2017].

Stenberg, Daniel; Curl_Easy_Perform_Perform_A_File-Transfer_Synchronously (2017).

The Chromium Projects, SPDY Protocol—Draft 2; [Viewed Sep. 28, 2017].

* cited by examiner

US 10,965,607 B2

ARBITRATION OF COMPETING FLOWS

TECHNICAL FIELD

The present disclosure generally relates to data delivery systems.

BACKGROUND

By way of introduction, available bandwidth is typically one of the main constraints in a content delivery system. For example, a gateway or set-top box (STB) may be downloading various types of content, for example, live content, real-time recordings, video on demand content, content pushed by a content provider for later viewing (e.g., video on demand content and replacement advertisements) as well as interactive TV downloads and software downloads. It will be appreciated that some of the content examples in the previous list are more time sensitive than other content types in the list. For example, live content is probably the most time sensitive in the previous list. Content items may be downloaded using an adaptive bitrate (ABR) mechanism whereby bitrate is adjusted according to the prevailing bandwidth. In many situations, using ABR results in a better rendering result whereby instead of having blank screens while waiting for high bitrate content, content is delivered at a lower bitrate while bandwidth is low. However, in other situations, ABR may be detrimental to the content delivery and rendering. For example, if a STB is downloading a live content item and content pushed by the content provider at the same time and the live content item is being downloaded using ABR and the pushed content is not being downloaded by ABR, the live content item is squeezed to use a lower bitrate than the pushed content, even though the pushed content is probably not even needed for rendering at present.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a gateway including a memory, and a processor to in response to receiving a plurality of content requests, generate a plurality of network flows and a plurality of flow buffers, each one content request of the plurality of content requests being served by one network flow of the plurality of network flows, and one flow buffer of the plurality of flow buffers, the one flow buffer being included in the memory, the plurality of network flows including a first flow and a second flow, the first flow serving one of the plurality of requests having a first priority level, the second flow serving one of the plurality of requests having a second priority level, the first priority level being higher than the second priority level, and run a network arbiter to give prioritize reading the first flow over reading the second flow when the first flow is non-idle.

DETAILED DESCRIPTION

Figure 1:
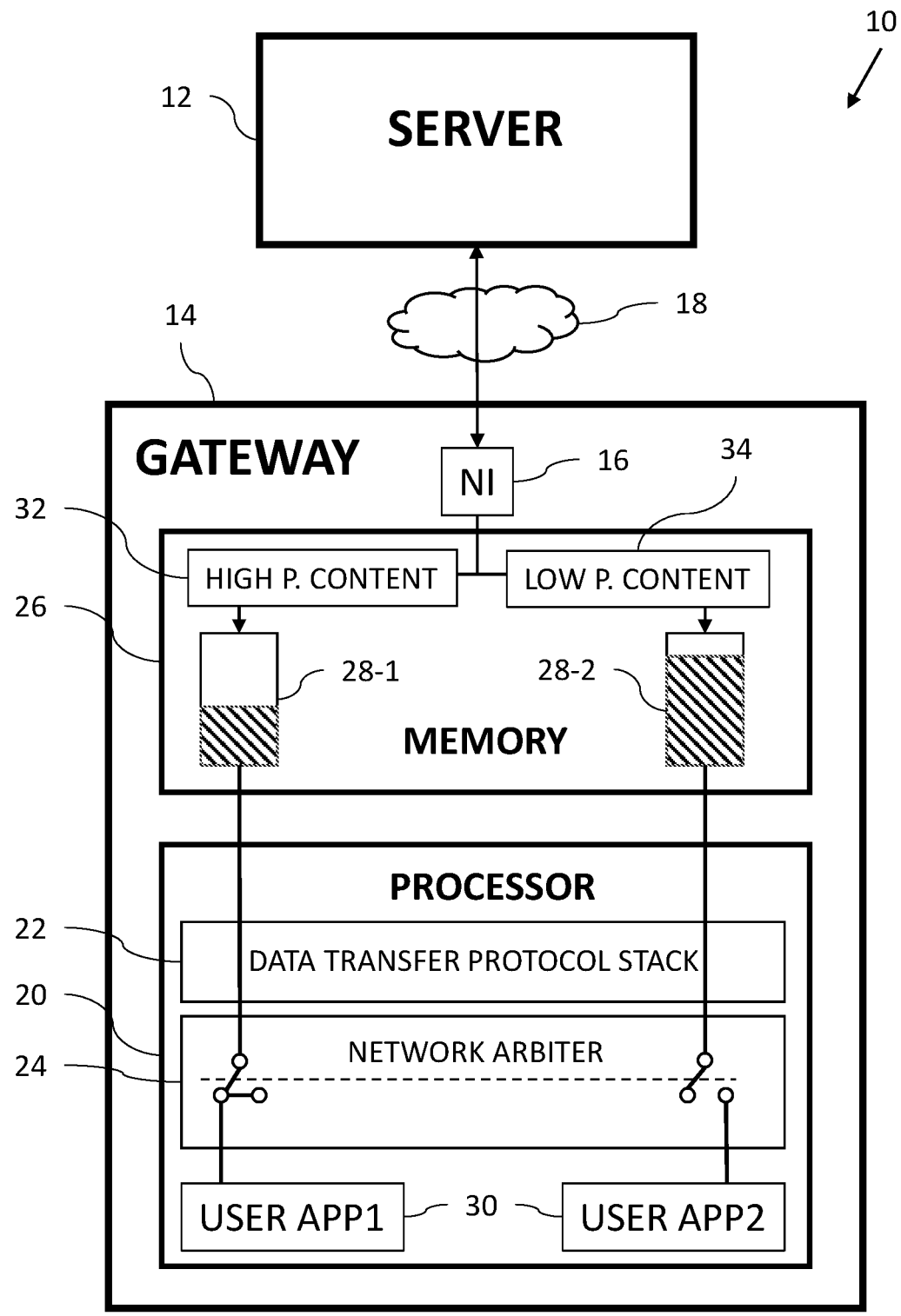
FIG. 1 is a block diagram view of a content delivery system constructed and operative in accordance with an embodiment of the present disclosure.

Reference is made to FIG. 1, which is a block diagram view of a content delivery system 10 constructed and operative in accordance with an embodiment of the present disclosure. The content delivery system 10 includes at least one server 12 to serve content to a plurality of gateways 14, e.g., home gateway, video gateways, smart television (TV) and/or set-top boxes (STBs). For the sake of simplicity, only one server 12 and gateway 14 is shown in FIG. 1. For the sake of simplicity, the description below also generally refers to a single gateway 14 receiving content from a single server 12. However, it will be appreciated that each gateway 14 may be receiving multiple content items from the server 12 or from different servers 12. It will be appreciated that the content delivery system 10 is not limited to delivery of video or media content but may include the delivery of any time critical data.

The gateway 14 includes a network interface (NI) 16 for interfacing with the server 12 over a network 18 to request and receive content from the server 12. The NI 16 receives datagrams from, and sends datagrams to, the server 12. The network 18 may be any suitable network or communication medium, for example, but not limited to, an Internet Protocol (IP) network, a cable TV communication network, a wireless network, a cellular network etc.

The gateway 14 includes a processor 20 to run various processes including a data transfer protocol stack 22, a network arbiter 24, and various user applications 30 (e.g., USER APP1 and USER APP2 in FIG. 1) amongst others. The data transfer protocol stack 22 may be a Hypertext Transfer Protocol (HTTP) over Transmission Control Protocol (TCP) over IP stack or any other suitable protocol stack. The network arbiter 24 is placed, for data transfer purposes, between the data transfer protocol stack 24 and the user applications 30. This aspect is described in more detail with reference to FIG. 4. The user applications 30 are typically associated with processing content requests to retrieve and/or render content. Each user application 30 may be an ABR client, by way of example only. The various processes run by the processor are described in more detail below with reference to FIGS. 2-5.

The gateway 14 includes a memory 26 to store software programs loaded and executed by the processor 20 and store data used by the processor 20 during executing of various software programs. The memory 26 is also operative to store data received from the server 12 in various buffers, for example, but not limited to, flow buffers 28. By way of example, FIG. 1 shows a high priority content 32, requested by USER APP1, being received in one of the flow buffers 28 (the flow buffer 28-1) and a low priority content 34, requested by USER APP2, being received in one of the flow buffers 28 (the flow buffer 28-2). The flow buffers 28 may be TCP socket buffers, by way of example only.

Assuming that the low priority content 34 is less important than the high priority content 32, the gateway 14 is generally configured, using the network arbiter 24, so that while high priority content 32 is being received (and/or any other high priority content), transfer of the low priority content 34 (and/or other lower priority content) in the gateway 14 is suppressed by the network arbiter 24. Complete suppression of the transfer of the low priority content 34 (and/or other lower priority content) by the network arbiter 24 provides uncontended network access to the high priority content (and/or other high priority content) so that the low priority content 34 (and/or other lower priority content) does not contend with the network access to the high priority content (and/or other high priority content).

In overview, the network arbiter 24 prioritizes the content requests of the user applications 30 into different priorities. There may be two or more different priority levels (e.g.: high and low; or high, medium and low; or 1, 2, and 3 etc.). While a network flow (or network flows) associated with a first priority level is (are) non-idle, the network arbiter 24 is operative to block transfer of data to the user application(s) of a content request (or requests) having a priority level, which is lower than the first priority level. So in other words, transfer of data associated the user application(s) 30 of a lower priority level content request (or requests) is blocked at the flow level when at least one higher priority level flow (e.g., socket) is non-idle. Blocking transfer of data at the flow level includes blocking the transfer of data datagrams of the lower priority content request(s) by the data transfer protocol stack 22 from the flow buffer(s) 28 to the user application(s) 30 of the lower priority content request(s). Blocking the transfer of data from one or more of the flow buffers 28, results in the one or more flow buffer(s) 28 filling up, which in turn results in a flow control mechanism being initiated, which results in no new data being sent from the server 12 to the flow(s) of the full flow buffer(s) 28. FIG. 1 shows the beginning of the blocking process whereby data transfer from the flow buffer 28-2 is being blocked and the flow buffer 28-2 is just starting to fill up. The network arbiter 24 is operative to unblock transfer of data of content requests having a second priority level when all the flows of content requests having a priority above the second priority level are idle. The terms "flow" and "network flow" as used in the specification and claims, in any grammatical form, are used interchangeably.

So for example, if there are two priority levels, high and low, then transfer of data of low priority content request(s) is blocked at the flow level while a flow (or flows) of a high priority content request is (are) non-idle. As long as there is at least one non-idle flow of a content request at the high level, the transfer of data of low priority request(s) is blocked at the flow level. When the flow(s) of the high level content request is (are) idle (i.e., if there are multiple flows at the high level then all need to be idle), the transfer of data of low priority request(s) is unblocked at the flow level.

By way of another example, if there are three priority levels, high, medium and low, then the transfer of data of the low and the medium priority content requests are blocked at the flow level while any flow of the high priority level is non-idle. If all flows at the high priority level are idle, then the transfer of data of the medium priority level content requests are unblocked at the flow level, but the transfer of data of the low priority level requests remains blocked at the flow level as long as at least one of the flows of the medium priority level content requests is non-idle. If all the flows of the high and medium priority level content requests are idle, then the transfer of data of the low priority level content requests is unblocked at the flow level.

For the sake of simplicity, the description below generally refers to two priority levels, high and low. It will be appreciated that the description included below may be expanded with suitable changes for implementations with three or more priority levels. For the sake of simplicity, the description below describes one high priority level content request and one low level content request. It will be appreciated that the description included below may be expanded with suitable changes for implementations including more than one high level content request, and/or more than one low level content request, and/or more than one medium level content request, etc. For the sake of illustration only, the high priority content 32 is given as an example of content of a high priority level content request and the low priority content 34 is given as an example of content of a low priority content request. It should be noted that when the flows of high priority level content requests are idle, the transfer of data of existing low priority level content requests may be unblocked and/or new low priority level content requests may be allowed to start downloading.

It should also be noted that during ABR download there are generally time slots when ABR content is not being received and the flow(s) of the ABR download is (are) idle. It is during these idle periods that other content associated with lower priority content requests may resume transfer. However, if the gateway 14 is downloading two or more live ABR streams, by way of example only, there may be no idle time even during the ABR download to allow low priority content requests to be received.

Figure 2:
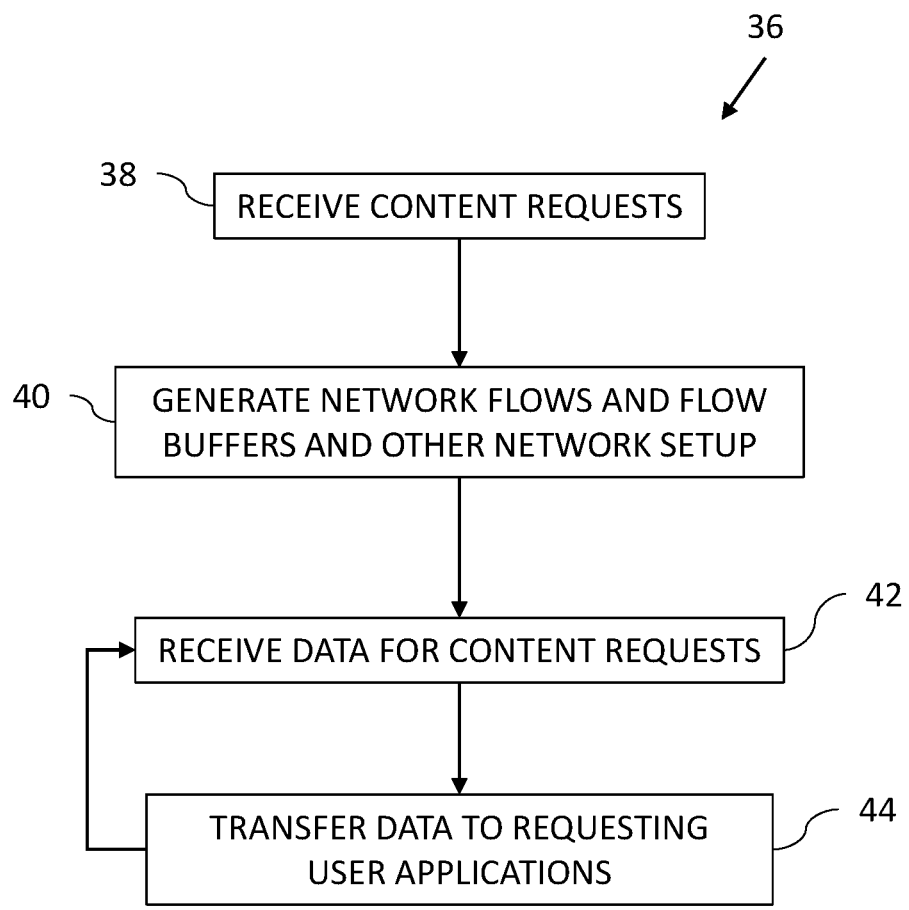
FIG. 2 is a flow chart showing exemplary steps in a method of operation of a gateway in the content delivery system of FIG. 1.

Reference is made to FIG. 2, which is a flow-chart 36 including exemplary steps in a method of operation of the gateway 14 in the content delivery system 10 of FIG. 1. Reference is also made to FIG. 1. The processor 20 is operative to receive (block 38) content requests from the user applications 30 via the network arbiter 24. The processor 20 is operative, in response to receiving the content requests, to generate (block 40) a plurality of network flows and the flow buffers 28 and other network flow functions. Each content request is served by a network flow and at least one flow buffer 28. Each flow buffer 28 is included in the memory 26.

Each content request typically includes content type and content download type information (described in more detail with reference to FIG. 4) which is used by the network arbiter 24 to determine a priority level of each content request. In some embodiments, content type and content download type information may be signaled out of band by the user applications 30 to the network arbiter 24. Some of the content requests may be adaptive bitrate (ABR) content requests, whereas other content requests may include non-ABR content requests. The content type associated with each content request may include one of the following, by way of example only: live viewing using adaptive bitrate to vary video quality to avoid underrun; video-on-demand content using progressive download at fixed quality to a local disk in the gateway 14; real-time recording using ABR to vary quality with writing to a local disk in the gateway 14 and allow playback from that local copy (the stored local copy would show quality variations if network conditions are variable, but the recording would complete when the event finishes); or a deadline-driven non-real-time recording taking advantage of extended availability of segmented live content on the network to allow a fixed quality to be acquired in non-real-time (the recording may complete after the event finishes but the locally stored copy has a fixed quality).

The processor 20 is operative to receive (block 42) data (content) for the content requests via the flows and flow buffers 28. The data transfer protocol stack 22 running on the processor 20 is operative to read the flow buffers 28 and transfer (block 44) the data from the flow buffers 28, under control of the network arbiter 24, to the corresponding requesting user applications 30. The steps of blocks 42 and 44 are repeated until the relevant content is received for each content request.

The sending of the content requests to the server 12 and the receiving of the data from the server 12 may use any suitable application protocol, for example, but not limited to HTTP. It will be appreciated that the application protocol used may be dependent on the type of network 18. The flows may be implemented using any suitable protocol or other software that includes a flow control mechanism, for example, but not limited to, TCP. The server 12 pushes data for a content request to the gateway 14 as long as there is space in the flow buffer 28 in the gateway 14 of that content request. In the gateway 14, the data transfer protocol stack 22 running on the processor 20, transfers data from the flow buffers 28 under control of the network arbiter 24, to the corresponding user applications 30 as soon as possible. If there is no space in one of the flow buffers 28 in the gateway 14, a flow control mechanism (for example, but not limited to, based on TCP) is initiated resulting in no new data being sent from the server 12 to the flow of that full flow buffer 28.

Figure 3:
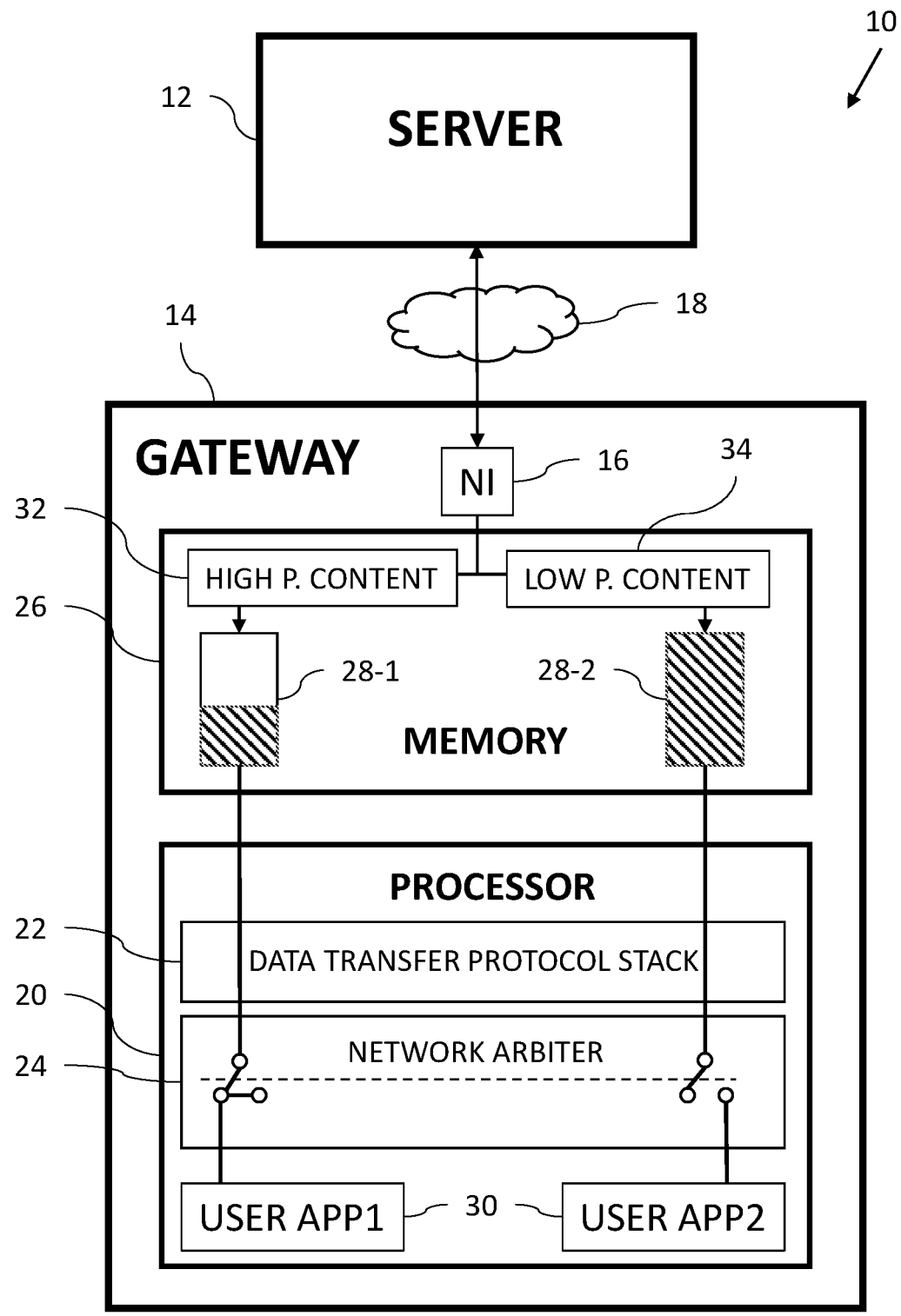
FIG. 3 is a block diagram view showing a network arbiter blocking reading a flow buffer in the system of FIG. 1.

Reference is made to FIG. 3, which is a block diagram view showing the network arbiter 24 blocking reading of the flow buffer 28-2 in the system 10 of FIG. 1. FIG. 3 shows that the high priority content 32 is being received by the flow buffer 28-1 and transferred, under control of the network arbiter 24, to the user application 30 that requested the high priority content 32. Therefore, the flow serving the content request of the high priority content 32 is non-idle. In response to the flow serving the content request of the high priority content 32 being non-idle, the network arbiter 24 blocks the transfer of data, by the data transfer protocol stack 22, from the flow buffer 28-2 to the user application 30 that requested the low priority content 34 (FIG. 1). The blocking typically blocks application reads of the flow buffer 28-2 by the data transfer protocol stack 22. The blocking may block transfer of read data to the user application 30 that requested the low priority content 34, thereby leading to preventing further reading of the flow buffer 28-2. The flow buffer 28-2 therefore fills up and a flow control mechanism is initiated, by software running on the processor 20, resulting in no new data being sent from the server 12 to the flow of the full flow buffer 28-2. The transfer of data from the flow buffer 28-2 by the data transfer protocol stack 22 is generally completely blocked while the flow of the high priority content 32 is non-idle. However, it will be appreciated that an incomplete blocking (e.g., transferring some of the data from the flow buffer 28-2) or a reduction in the transfer rate of data from the flow buffers 28-2 may also be effective in initiating the flow control mechanism (at least during some of the time while the flow of the high priority content 32 is non-idle) thereby protecting the bandwidth available to the high priority content 32. Data will not generally be sent from the server 12 to the flow of the flow buffer 28-2 until the transfer of data from the flow buffer 28-2 is unblocked by the network arbiter 24.

Figure 4:
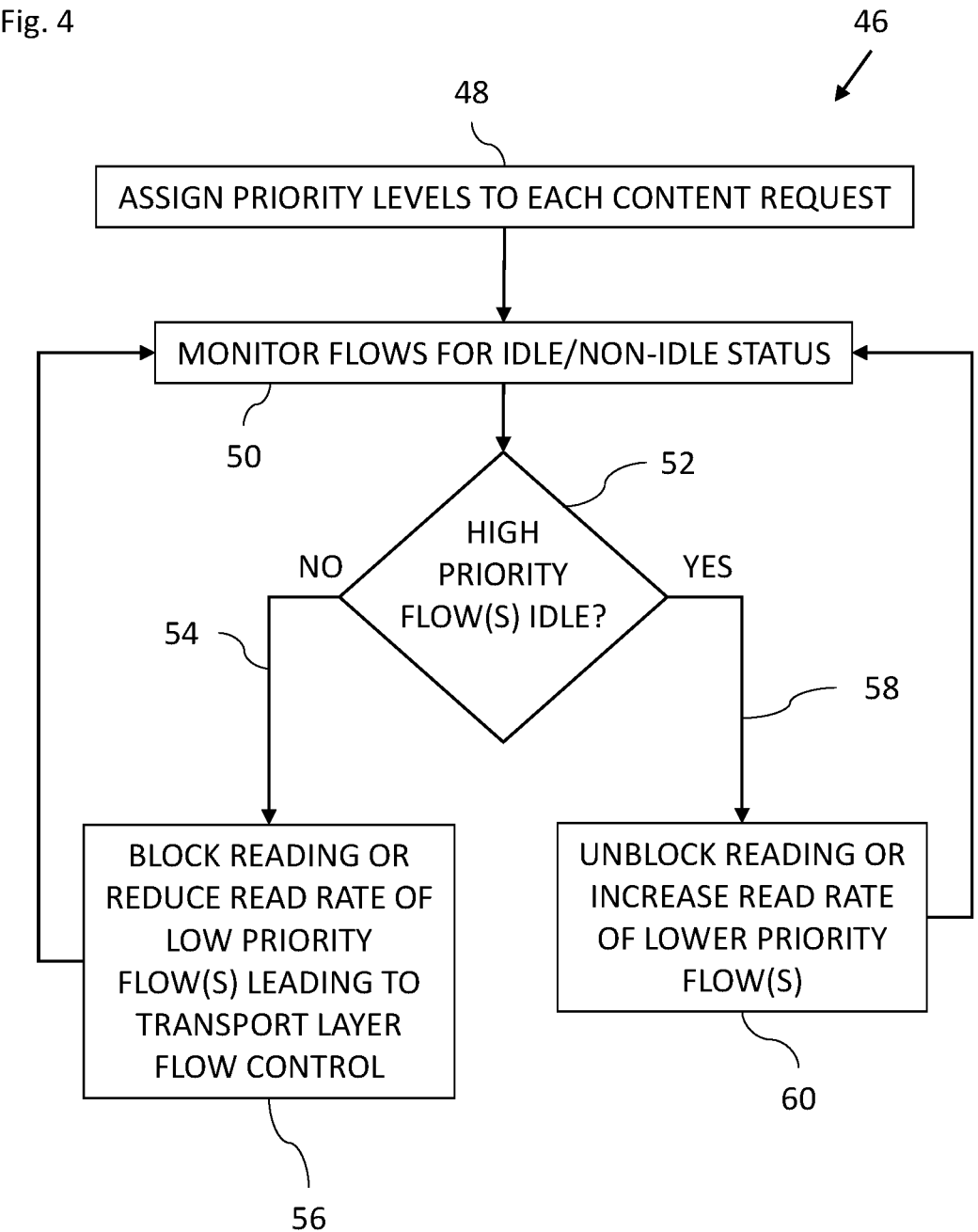
FIG. 4 is a flow chart showing exemplary steps in a method of operation of the network arbiter of FIG. 3.

Reference is made to FIG. 4, which is a flow chart 46 including exemplary steps in a method of operation of the network arbiter 24 of FIG. 3. Reference is also made to FIG. 3. The network arbiter 24 is operative to assign (block 48) a priority level to each content request. The priority level is assigned to each content request according to a content type of that content request. A highest priority level is typically assigned to a live viewing content request. Higher priority is typically given to ABR download over non-ABR download. Higher priority is given to real-time over non-real-time. As described above, there may be two or more priority levels according to the implementation.

The network arbiter 24 is operative to give priority to reading a non-idle high priority flow (i.e. a flow serving a high priority content request) over reading a non-idle low priority flow (i.e. a flow serving a low priority content request). This step is now described in more detail below. The network arbiter 24 is operative to monitor (block 50) the flows for idle and non-idle status. The network arbiter 24 is operative to check (decision block 52) if the high priority flow(s) are idle. If any of the high priority flows are non-idle (or if the high priority flow is non-idle, if there is only one high priority flow) (branch 54), the network arbiter 24 is operative to block reading or reduce a read rate of the low priority flow(s) by the data transfer protocol stack 22 (block 56). In response to blocking reading or reducing the read rate of the low priority flow, the flow control mechanism (e.g., of TCP) is initiated resulting in no new data being sent from the server 12 for receipt by the low priority flow, thereby allowing more network bandwidth for the content request served by the high priority flow. The high priority flow is generally considered to be non-idle during a period extending from starting reading, from the high priority flow, a first byte of a body of a response message to a request for content, until completing reading, from the high priority flow, a last byte of the body of the response message.

In an HTTP TCP/IP environment, the data transfer protocol stack 22 may include a libcurl library to implement receiving content requests from the user applications 30 via the network arbiter 24 and transferring data from the flow buffers 28 to the user applications 30 under control of the network arbiter 24. In other words, the network arbiter 24 is placed, for data transfer purposes, between the data transfer protocol stack 24 and the user applications 30. In such an environment, the network arbiter 24 blocks the transfer of data from the flow buffer 28-2 to the requesting user application 30 by stalling the call-back from the libcurl library to the user applications 30. This in turn prevents libcurl from continuing to read from the low priority flow until the callback has returned. Example C++ code for implementing the network arbiter 24 is included in the Annex.

Figure 5:
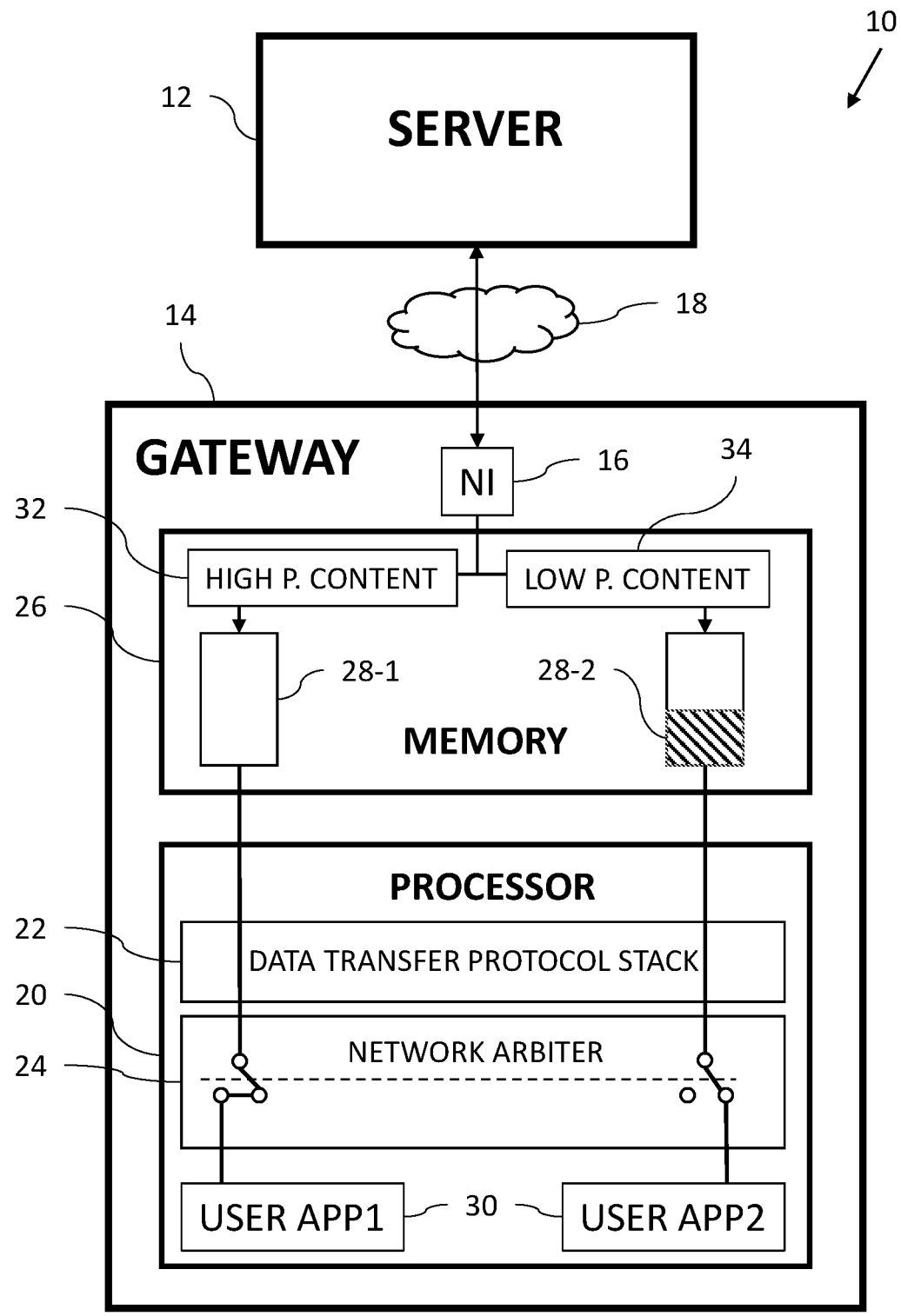
FIG. 5 is a block diagram view showing the network arbiter unblocking reading of the flow buffer in the system of FIG. 1.

Reference is made to FIG. 5, which is a block diagram view showing the network arbiter 24 unblocking reading of the flow buffer 28-2 in the system of FIG. 1. The network arbiter 24 unblocks reading of the flow buffer 28-2 when the flow of the high priority content 32 (FIG. 3) is idle. The data transfer protocol stack 22 then continues to transfer data from the flow buffer 28-2 which in turn initiates the flow control mechanism to allow data to be sent from the server 12 to the flow associated with the flow buffer 28-2.

Reference is again made to FIG. 4. If all of the high priority flows are idle (or if the high priority flow is idle, if there is only one high priority flow) (branch 58), the network arbiter 24 is operative to unblock reading or increase the read rate of the low priority flow(s) (block 60).

In practice, some or all of the functions of the processor 20 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A gateway comprising:
   a memory; and
   a processor coupled to the memory, wherein the processor is operative to:
   in response to receiving a plurality of content requests, generate a plurality of network flows and a plurality of socket buffers, each one content request of the plurality of content requests being served by: one network flow of the plurality of network flows and one socket buffer of the plurality of socket buffers, the plurality of network flows including a first flow and a second flow, the first flow serving a first request of the plurality of requests having a first priority level, the second flow serving a second request of the plurality of requests having a second priority level, the first priority level being higher than the second priority level;
   prioritize reading a first socket buffer of the plurality of socket buffers serving the first flow over reading a second socket buffer of the plurality of socket buffers serving the second flow when the first flow is non-idle, wherein the processor being operative to prioritize the reading of the first socket buffer comprises the processor being operative to initiate blocking, by a data transfer protocols stack, transfer of datagrams from the second socket buffer to an application initiating the second request when the first flow is non-idle; and
   initiate a flow control mechanism of a flow control protocol to regulate new data being sent from a server for receipt by the second socket buffer.

2. The gateway according to claim 1, wherein the processor being further operative to:
   unblock reading of the second socket buffer when the first flow is idle.

3. The gateway according to claim 1, wherein the first flow is non-idle during a period extending from starting reading, from the first socket buffer, a first byte of a body of a response message until completing reading, from the first socket buffer, a last byte of the body of the response message.

4. The gateway according to claim 1, wherein the plurality of content requests includes at least one adaptive bitrate content request.

5. The gateway according to claim 1, wherein a network arbiter is operative to assign a priority level to the each one content request of the plurality of content requests.

6. The gateway according to claim 1, wherein a priority level is assigned to the each one content request of the plurality of content requests according to a content type of the one content request.

7. The gateway according to claim 6, wherein a highest priority level is assigned to a live viewing content request.

8. The gateway according to claim 6, wherein the content type includes one of the following: live viewing using adaptive bitrate; video on demand content; real-time recording; or a non-real-time recording.

9. A method comprising:
   in response to receiving a plurality of content requests, generating a plurality of network flows and a plurality of socket buffers, each one content request of the plurality of content requests being served by: one network flow of the plurality of network flows and one socket buffer of the plurality of socket buffers, the plurality of network flows including a first flow and a second flow, the first flow serving a first request of the plurality of requests having a first priority level, the second flow serving a second request of the plurality of requests having a second priority level, the first priority level being higher than the second priority level;
   prioritizing reading a first socket buffer of the plurality of socket buffers serving the first flow over reading a second socket buffer of the plurality of socket buffers serving the second flow when the first flow is non-idle, wherein prioritizing the reading the first socket buffer comprises blocking, by a data transfer protocols stack, transfer of datagrams from the second socket buffer to an application initiating the second request when the first flow is non-idle; and
   initiating a flow control mechanism of a flow control protocol to regulate new data being sent from a server for receipt by the second socket buffer.

10. The method to claim 9, further comprising:
    unblocking reading of the second socket buffer when the first flow is idle.

11. The method to claim 9, wherein the first flow is non-idle during a period extending from starting reading, from the first socket buffer, a first byte of a body of a response message until completing reading, from the first socket buffer, a last byte of the body of the response message.

12. The method to claim 9, wherein the plurality of content requests includes at least one adaptive bitrate content request.

13. The method to claim 9, further comprising assigning a priority level to each one content request of the plurality of content requests.

14. The method to claim 9, wherein a priority level is assigned to each one content request of the plurality of content requests according to a content type of the one content request.

15. The method to claim 14, wherein a highest priority level is assigned to a live viewing content request.

16. A non-transient computer-readable medium in which program instructions are stored, which when read by a central processing unit (CPU), cause the CPU to:
 in response to receiving a plurality of content requests, generate a plurality of network flows and a plurality of socket buffers, each one content request of the plurality of content requests being served by: one network flow of the plurality of network flows and one socket buffer of the plurality of socket buffers, the plurality of network flows including a first flow and a second flow, the first flow serving a first request of the plurality of requests having a first priority level, the second flow serving a second request of the plurality of requests having a second priority level, the first priority level being higher than the second priority level;
 prioritize reading a first socket buffer of the plurality of socket buffers serving the first flow over reading a second socket buffer of the plurality of socket buffers serving the second flow when the first flow is non-idle, wherein prioritizing the reading the first socket buffer comprises blocking, by a data transfer protocols stack, transfer of datagrams from the second socket buffer to an application initiating the second request when the first flow is non-idle; and
 initiate a flow control mechanism of a flow control protocol to regulate new data being sent from a server for receipt by the second socket buffer.

17. The non-transient computer-readable medium according to claim 16, wherein the instructions further cause the CPU to:
 unblock reading of the second socket buffer when the first flow is idle.

18. The non-transient computer-readable medium according to claim 16, wherein the first flow is non-idle during a period extending from starting reading, from the first socket buffer, a first byte of a body of a response message until completing reading, from the first socket buffer, a last byte of the body of the response message.

19. The non-transient computer-readable medium according to claim 16, wherein a priority level is assigned to the each one content request of the plurality of content requests according to a content type of the one content request.

20. The non-transient computer-readable medium according to claim 19, wherein a highest priority level is assigned to a live viewing content request.

* * * * *